(12) United States Patent
Djabour et al.

(10) Patent No.: US 12,539,719 B2
(45) Date of Patent: Feb. 3, 2026

(54) TIRE TREAD COMPRISING COMPLEX GROOVES AND INCISIONS

(71) Applicant: COMPAGNIE GENERALE DES ETABLISSEMENTS MICHELIN, Clermont-Ferrand (FR)

(72) Inventors: Walid Djabour, Clermont-Ferrand (FR); Houria Belarbi, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1092 days.

(21) Appl. No.: 17/277,725

(22) PCT Filed: Sep. 17, 2019

(86) PCT No.: PCT/FR2019/052159
§ 371 (c)(1),
(2) Date: Mar. 18, 2021

(87) PCT Pub. No.: WO2020/058622
PCT Pub. Date: Mar. 26, 2020

(65) Prior Publication Data
US 2021/0347209 A1   Nov. 11, 2021

(30) Foreign Application Priority Data

Sep. 20, 2018 (FR) ...................................... 1858495

(51) Int. Cl.
*B60C 11/03* (2006.01)
*B60C 11/12* (2006.01)

(52) U.S. Cl.
CPC ...... *B60C 11/0323* (2013.01); *B60C 11/1236* (2013.01); *B60C 2011/0346* (2013.01); *B60C 2011/0355* (2013.01); *B60C 2200/06* (2013.01)

(58) Field of Classification Search
CPC ............... B60C 11/0323; B60C 11/032; B60C 11/1281
See application file for complete search history.

(56) References Cited

U.S. PATENT DOCUMENTS

2013/0014870 A1* 1/2013 Georges .................. B60C 11/12
152/209.18
2013/0098519 A1   4/2013 Maehara
(Continued)

FOREIGN PATENT DOCUMENTS

CN        103057358       4/2013
DE        102016211108    12/2017
(Continued)

OTHER PUBLICATIONS

Office Action dated Apr. 6, 2022 issued in Chinese Patent Application No. 201980060806.0.

*Primary Examiner* — Katelyn W Smith
*Assistant Examiner* — Thomas Frank Schneider
(74) *Attorney, Agent, or Firm* — COZEN O'CONNOR

(57) ABSTRACT

A tire tread (1) having a tread pattern depth Hm, with at least two longitudinally oriented grooves (31, 41, 42), at least one of them being a complex groove (31), that in the new state, is alternately external cavities (311) that open onto the tread surface and internal cavities (312) that are hidden within the thickness of the tread. The external cavities (311) have a mean longitudinal length Lm, a depth at least equal to 0.9 Hm, and are separated by internal cavities having a mean longitudinal length Li, Li being at least equal to 0.5*Lm and at most equal to 2*Lm. At least one rib (21) in the longitudinal direction and delimited by a complex groove with transverse sipes (5) made at a mean spacing Pm. The spacing Pm of the transverse sipes is at most equal to the mean longitudinal length Lm of the external cavities (311).

11 Claims, 2 Drawing Sheets

(56) References Cited

U.S. PATENT DOCUMENTS

2013/0340905 A1 12/2013 Bechon et al.
2018/0141386 A1* 5/2018 Zhu .................... B60C 11/0323

FOREIGN PATENT DOCUMENTS

| | | |
|---|---|---|
| FR | 2 967 940 | 6/2012 |
| FR | 3 049 896 | 10/2017 |
| WO | WO 2011/039194 | 4/2011 |
| WO | WO 2016/190881 | 12/2016 |
| WO | WO-2016190881 A1 * 12/2016 ......... B60C 11/0323 |
| WO | WO 2017/177132 | 10/2017 |

* cited by examiner

TIRE TREAD COMPRISING COMPLEX GROOVES AND INCISIONS

RELATED APPLICATIONS

This is a U.S. National Phase Application under 35 USC 371 of International Application PCT/FR2019/052159 filed on Sep. 17, 2019.

This application claims the priority of French application no. 18/58495 filed Sep. 20, 2018, the entire content of which is hereby incorporated by reference.

FIELD OF THE INVENTION

Background of the Invention

The invention relates to treads for tires and more particularly to the tread patterns of these treads, the performance of which in terms of draining away water in wet weather is made more durable, these treads also exhibiting improved performance in terms of wear and rolling resistance; this invention also relates to the tires provided with such treads.

Prior Art

As is known, the wet-weather running conditions of a vehicle and more particularly, but not only, of a heavy-duty vehicle require rapid evacuation of the water that can be located in the contact patch in which the tire or more particularly the tread thereof is in contact with the road surface. This evacuation makes it possible to ensure contact between the material of which the tread is made and this road surface. The water that is not pushed ahead of and to the sides of the tire flows or is collected partially in the cuts or voids formed in the tread of the tire.

These cuts or voids form a fluid flow network that needs to be lasting, that is to say able to be effective throughout the duration of use of a tire between its new state and its removal on account of wear when the latter reaches a limit set by the manufacturer in accordance with the regulations in force.

In particular for the tires intended for the steering axles or load-bearing axles of a heavy-duty vehicle and for certain driven tires intended for road or motorway use, it is common practice to form, in the tread of these tires, circumferential grooves (or longitudinally oriented grooves), the depth of which is equal to the total thickness of the tread. This total thickness does not take into account the thickness possibly provided to allow partial renewal of the grooves through an operation known as regrooving, or the residual thickness that makes it possible to protect the reinforcing elements of the radially outermost layer of reinforcing elements of the tire. Thus, it is possible to obtain a tread that has a water drainage performance which is always above a minimum performance level referred to as safe performance, this being true regardless of the level of wear of this tread.

For tires of the prior art, the total voids volume when new is, as a general rule, between 10% and 25% of the total volume of the tread intended to be worn away during running (the total volume corresponding to the volume of material to which said total voids volume is added). These tires are found to have an available voids volume in the contact patch which is relatively high in the new state (available voids volume meaning that this volume is potentially able to be partially or completely filled with water present on the road surface). The volume of voids opening onto the tread surface in the contact patch is evaluated when the tire is subjected to its usual inflation and load conditions as defined in particular by the E.T.R.T.O. standard for Europe.

While cuts or, more generally, cavities are essential to draining away water in the contact patch in contact with the road surface, the resulting reduction in the volume of material on the tread may appreciably affect the wearing performance of this tread and consequently may reduce the service life of the tire that results from an increase in the rate of wear of said tread.

Among the cuts that can be made in a tread by moulding, a distinction is made between grooves and sipes. Unlike grooves, sipes have a width such that the opposing walls that delimit them come at least partially into contact with one another when entering the contact patch.

The grooves bring about a substantial reduction in the compression and shear stiffnesses because these grooves delimit portions of material that are able to deform, compared with the portions delimited by sipes, the walls of which come to bear against one another when entering the contact patch. This decrease in stiffness, when grooves are present, causes an increase in deformations and is liable to bring about a decrease in the wearing performance of the tread. Greater wear is observed for a set distance covered and this corresponds to an increase in the rate of wear of the tread.

Moreover, an increase in rolling resistance and therefore in the fuel consumption of vehicles equipped with such tires having, by comparison, more than two grooves has been observed, resulting from an increase in the hysteresis losses associated with the cycles of deformation of the material of which the tread is made.

In order to limit the drop in total volume of the tread, it is possible to have longitudinally oriented grooves, known as complex grooves, which have the effect that the percentage of surface voids varies significantly, even in a non-linear manner, with wear, in order to increase the total volume of the tread while maintaining the volume of voids for minimal water storage regardless of the level of wear of the tire. These grooves comprise alternately external cavities that open onto the tread surface in the new state and internal cavities that are hidden within the thickness of the tread in the new state, said external and internal cavities being connected so as to allow water to be stored in the internal cavities, in the new state, by passing through the external cavities.

The patents DE102016211108 and WO2011039194 propose forming a tread for a tire intended for a heavy-duty vehicle. This tread is provided with complex grooves that open onto the tread surface in a discontinuous manner, at a regular or irregular spacing, when new. Each complex groove has external cavities that open onto the tread surface, these external cavities being separated from one another in the main direction of the complex groove. The main direction of the complex groove corresponds to the direction in which water flows in said groove when running on ground covered in water. This complex groove comprises, besides the external cavities, internal cavities formed inside the tread. These internal cavities are placed radially and entirely on the inside with respect to the tread surface in the new state between the external cavities. The internal cavities may be designed to be situated at different depth levels in the thickness of the tread.

Moreover, the continuity of the flow of water, or more generally of fluid, in each complex groove in the new state is ensured by the linking of the external and internal cavities. The links between the internal and external cavities form a longitudinally oriented groove around the entire circumference of the tire, regardless of the local orientation of the internal or external cavities.

The juxtaposition of internal and external cavities that are not linked and do not allow fluid to flow from one to the other around the entire circumference of the tire does not constitute a longitudinally oriented groove.

By virtue of this tread structure, the volume of all of the cavities is reduced compared with what it would be with grooves that open completely onto the tread surface when new, these having a depth corresponding to the maximum depth of the internal or external cavities. This type of complex groove thus makes it possible to limit the reduction in stiffness of the tread in the new state that is associated directly with the presence of the grooves.

This type of complex groove may of course be combined with the presence of at least one groove that opens, along its entire length, onto the tread surface of the tread right from the new state.

This type of complex groove may be described as being a groove that, when new, opens discontinuously onto the tread surface when new.

It has been found that the mere presence of complex grooves does not make it possible to achieve the level of grip under traction and under braking required on certain heavy-duty vehicles and that it is necessary to supplement these grooves with sipes that open, when new, onto the tread surface in order to generate an additional length of edge corners beneficial to achieving a good level of traction and a good level of grip under what are known as "slippery" conditions, notably on ground covered with water.

However, the combination of these sipes for obtaining acceptable grip with complex grooves having in particular cavities that are open and cavities that are hidden when new results in a worse performance in terms of noise.

Definitions

Each external cavity comprises opposing walls, these walls being connected together by a bottom that forms the bottom of the external cavity. The distance between the opposing walls defines a maximum width of the external cavity. The distance between the points of the bottom of the external cavity that are innermost in the tread and the tread surface when new defines a depth of the external cavity. Each external cavity has a maximum length of opening onto the tread surface, this length being measured between the furthest apart points of the edge-corner contour when new of said external cavity.

The tread surface of a tread corresponds to all of the elementary surfaces of the tread that can come into contact with a road surface when a tire provided with such a tread is running.

In the present document, a radial direction means a direction which is perpendicular to the axis of rotation of the tire (this direction corresponds to the direction of the thickness of the tread).

A transverse or axial direction means a direction parallel to the axis of rotation of the tire.

A circumferential or longitudinal direction means a direction tangential to any circle centred on the axis of rotation. This direction is perpendicular both to the axial direction and to a radial direction.

The total thickness of a tread is measured in the new state, on the equatorial median plane of the tire provided with this tread, between the tread surface and the radially outermost part of the crown reinforcement.

A tread has a maximum thickness of material to be worn away during running, this maximum thickness of material to be worn away being, as a general rule, less than the total thickness of the tread.

The equatorial median plane is a plane perpendicular to the axis of rotation dividing the tire into two equal halves.

The usual running conditions of the tire or conditions of use are those which are defined by the E.T.R.T.O. standard for running in Europe; these conditions of use specify the reference inflation pressure corresponding to the load-bearing capacity of the tire as indicated by its load index and speed rating. These conditions of use may also be referred to as "nominal conditions" or "working conditions".

SUMMARY OF THE INVENTION

An object of the invention is to propose a tread comprising at least one longitudinally oriented complex groove (that is to say a groove that is circumferential on the tire provided with said tread), this tread having a suitable level of grip, in particular on ground covered with water, and not developing uneven wear while at the same time limiting running noise. For this tread, the risk of initiating cracks as the result of picking up a stone or as a result of excessive local deformation is also reduced.

This objective is achieved by a tire tread comprising:
a tread surface,
this tread being provided with a tread pattern formed by at least two longitudinally oriented grooves, the tread pattern having a maximum tread pattern depth Hm,
at least one of the longitudinally oriented grooves, known as a complex groove, comprising alternately external cavities that open onto the tread surface in the new state and internal cavities that are hidden within the thickness of the tread in the new state,
the external cavities of each complex groove opening onto the tread surface when new with a contour having a mean longitudinal length Lm, and furthest apart end points A and B, the external cavities having a depth at least equal to 0.9 Hm,
the external cavities of each complex groove being separated by internal cavities having a mean longitudinal length Li, Li being at least equal to 0.5*Lm and at most equal to 2*Lm,
this tread comprising at least one rib oriented in the longitudinal direction of the tread and delimited by at least one of said complex grooves, the rib comprising transverse sipes—that is to say sipes with an orientation equal to or greater than 45 degrees to the longitudinal direction, made at a mean spacing Pm, the depth of these transverse sipes being at least equal to the depth 0.1*Hm,
the spacing Pm of the transverse sipes being at most equal to the mean longitudinal length Lm of the external cavities.

The external cavities of deepest depth, besides a large storage capacity, are advantageous as regards the application of national regulations. They make it straightforward for law enforcement personnel to check that the tire is roadworthy since the thickness of remaining rubber to be worn away is clearly apparent around the entire circumference of the tire. It is also a solution for informing the driver that their tires are capable of gripping a slippery road.

In order to optimize the stiffness of the ribs for wear and rolling resistance, it is appropriate to limit the number of longitudinally oriented grooves and therefore the number of complex grooves. For the same reasons, the lengths of the external cavities and the lengths of the internal cavities need to have a degree of proportionality. In order that the running tire does not generate a high level of noise at a frequency corresponding to the arrangement of the various cavities, the external and internal cavities do not necessarily have a constant length Lm and Li around the circumference of the tire. By varying the lengths of the various cavities, the sound power is distributed over several frequencies, greatly reducing the perception of unwanted noise. Thus, since they do not have a fixed length, the proportionality conditions of the internal and external cavities are given as the mean thereof over the complex groove in question.

Preferably, the total volumetric void ratio when new is at most equal to 13% and even more preferably at most equal to 10%. This ratio is calculated by taking all the voids formed in the tread into consideration.

The sipes have an impact on noise, the number and arrangement thereof are mostly conditional on the intended grip value, and the mean spacing of the sipes that is necessary for good grip (close to Lm+Li) is greater than the mean spacing of the external cavities. However, this arrangement is not optimal in terms of noise performance.

In the case of complex grooves, it is necessary to create a relationship between the mean length of the external cavities and the mean spacing between two sipes. Astonishingly, it has become apparent that it is necessary to offset the sipes in terms of frequency, towards frequencies higher than that of the external cavity and not of the entire tread pattern element formed by the internal cavity and external cavity, the mean effective spacing of which is Lm+Li. A sufficient condition for significantly offsetting the frequency of the sipes towards higher frequencies is that the spacing between two sipes is at most equal to Lm, preferably at most equal to 0.7 Lm, allowing a greater frequency offset.

In this way, optimal cooperation between the two forms of cuts in the tread pattern, namely the sipes and the complex grooves, is obtained, making it possible to improve the noise performance by around 2 to 4 dB, while having improved grip under traction and braking and in particular lasting grip.

For reasons of resistance to uneven wear and resistance to chunking of the points of rubber comprised between a sipe and a complex groove, the angle of the sipes with the circumferential direction is at least equal to 45°. The depth of the sipes is at least equal to 0.1*Hm whether these sipes are provided to have an effect for a short time or throughout the working life of the tire.

A preferred solution is that the sipes exhibit an angle with the radial direction, namely with the meridian planes, in order to improve the resistance to uneven wear, this angle being preferably at least equal to 5° and at most equal to 20°.

Uneven wear is understood here to mean that the wear is not distributed uniformly over the entire tread surface but rather that certain regions become more worn compared with other regions. This uneven wear may lead to tires being removed from a vehicle prematurely in order to be replaced with new tires, this considerably increasing the running cost per unit of distance travelled.

In a variant of the invention, the tread comprises several intermediate ribs and edge ribs, the latter axially flanking the intermediate ribs. Each intermediate rib, which is delimited by at least one complex groove, is provided with transverse sipes. A preferred solution is that the tread comprises at least three complex grooves, preferably that each longitudinally oriented groove is a complex groove.

For the best distribution of the contact surface between the different ribs in the contact patch, it is preferred that the external cavities of two adjacent complex grooves are offset circumferentially by a circumferential distance at least equal to 0.8*Lm. This arrangement makes it possible to improve the tire in terms of uneven wear.

To spread the sound power over time, it is preferred that the transverse sipes of two adjacent ribs are offset with respect to one another such that these transverse sipes come into contact with the road surface at different times. This characteristic allows an improvement of around 1 dB.

Preferably, for reasons of resistance to cracking and to local chunking of the rubbery compound of the tread where a sipe opens into an external cavity, the transverse sipes open into the external cavities at a minimum longitudinal distance from the ends A and B of the tread pattern elements of the external cavities at least equal to 1.5 mm.

A preferred solution is that the tread pattern elements of the external cavities are symmetric with respect to a longitudinal axis. The non-symmetric tread pattern elements bring about overconcentrations of stresses on the points of rubber added by the asymmetry, this weakening the tread pattern in these regions that are sensitive to chunking and uneven wear.

The invention also relates to a tire for a heavy-duty vehicle provided with a tread as described above.

Further features and advantages of the invention will become apparent from the following description given with reference to the appended drawings, which show, by way of non-limiting examples, embodiments of the subject matter of the invention.

DETAILED DESCRIPTION OF THE PRESENTLY PREFERRED EMBODIMENTS

Figure 1:
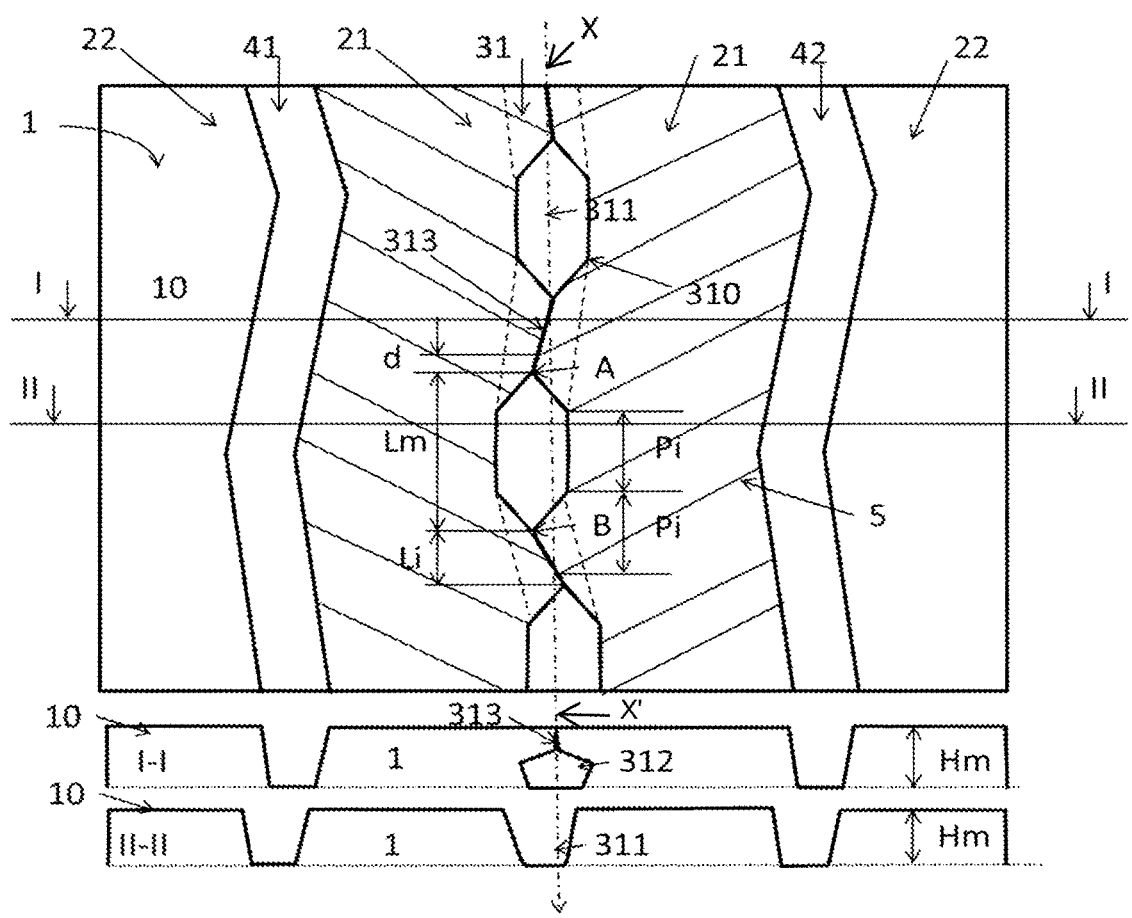
FIG. 1 shows a view of the surface of a tread of a tire of a heavy-duty vehicle in a first variant of the invention, and two cross sections thereof.

FIG. 1 presents a variant of the invention having a tread surface 10 intended to be in contact with a road surface when a tire provided with said tread is running. This tread 1 has a thickness of material to be worn away during running, in which cuts, complex grooves 31, non-complex grooves 41, 42 or sipes 5 are formed.

FIG. 1 shows the view of the tread surface 10 of this tread in the new state, this tread comprising three circumferentially oriented grooves 31, 41, 42 (in the circumferential direction indicated by the line XX'). FIG. 1 shows a case known from the prior art in which the grooves 31, 41, 42 locally form an angle with the longitudinal axis XX', but the mean of these angles of the grooves 31, 41, 42 all around the tire is equal to 0. These local variations do not mean that the grooves 31, 41, 42 are not circumferentially oriented.

These three grooves 31, 41, 42 delimit two intermediate circumferential ribs 21 and two edge ribs 22, axially on the outside. These grooves 41, 42, which are not complex, are cuts that open along their entire length onto the tread surface of the tread when new. These two grooves 41, 42 have the same mean width and a depth in this case equal to Hm (visible in the cross sections I and II). These two grooves flank a third, complex groove 31 having an alternation of external cavities 311 that are visible in the new state of the tread and internal cavities 312 that are hidden within the thickness of the tread in the new state, the external and internal cavities having a depth at least equal to 0.9*Hm, in this case equal to Hm.

The internal cavities 312, hidden in the new state, are connected to the external cavities 311, ensuring continuity of a flow of fluid in the groove in the new state and until a predetermined level of partial wear is reached.

The external cavities 311 of each complex groove 31 open onto the tread surface 10 when new and are bounded by a contour 310 of octagonal shape that is elongate in the circumferential direction and of which the furthest apart end points A and B are at a longitudinal distance Lm from one another, this distance Lm measuring the maximum longitudinal length of the contour of each external cavity 311, this always being realizable even when there are several ends A and B, there being only one maximum longitudinal length of the tread pattern element.

To facilitate the moulding and demoulding of the tread, the formation of circumferential sipes 313 that open onto the tread surface 10 and into the hidden cavities 312 is provided.

Each of the two intermediate ribs 21 of the tread is delimited both by a groove 41 or 42 that is open along its entire length and by the complex groove 31.

Furthermore, each of the intermediate ribs 21 is provided with transverse sipes 5 that in this case make an angle at least equal to 45 degrees with the circumferential direction XX'. These sipes 5 are disposed on each intermediate rib 21 with one and the same mean spacing Pm, which is the mean of the longitudinal distances Pi between two adjacent transverse sipes 5 on one and the same rib, all around the tire.

The depth of the transverse sipes may be variable and is at least equal to 0.1*Hm and at most equal to the maximum depth Hm of the tread.

The mean spacing Pm of the transverse sipes is, in this example, around 50% less than the mean longitudinal length Lm of the external cavities (311).

All of the sipes 5 that open into the complex groove 31 open into the latter at a longitudinal distance d from the ends A and B of the contour 310 of the external cavities at least equal to 1.5 mm.

FIG. 1 also shows two views in cross section on planes of which the lines on the tread are identified by the lines I-I and II-II, respectively.

Figure 2:
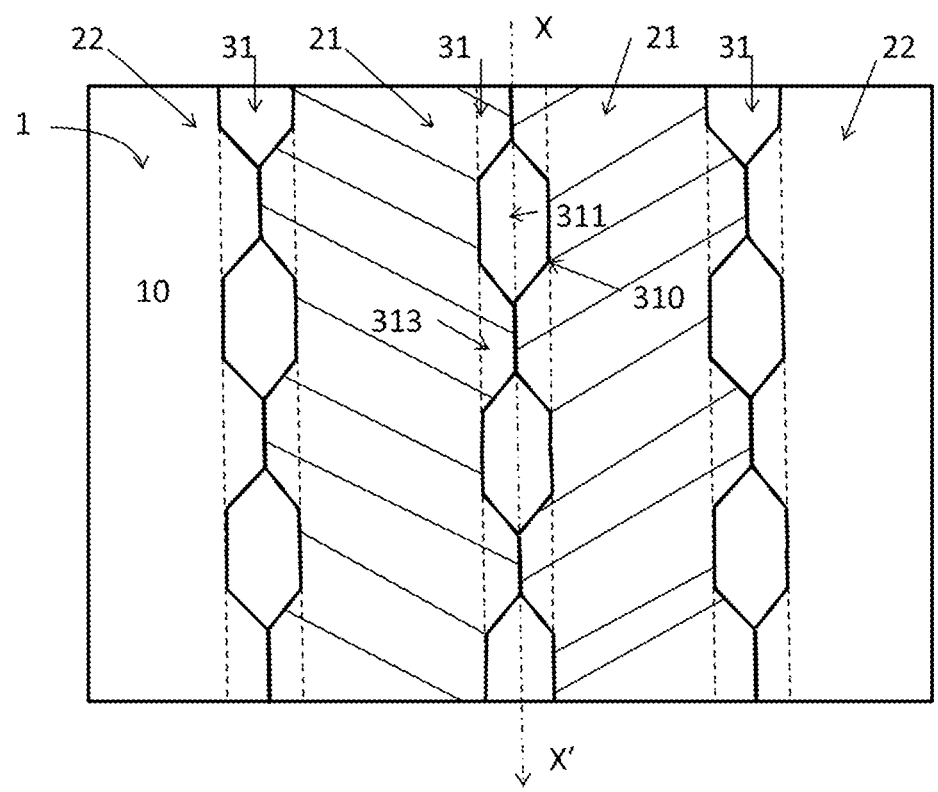
FIG. 2 shows a view of the tread surface of a tread 1 in a variant of the invention, in which all of the longitudinally oriented grooves are complex grooves.

FIG. 2 shows a view of the tread surface of a tread 1 in a variant of the invention, in which all of the longitudinally oriented grooves are complex grooves 31. The external cavities 311 of two adjacent complex grooves are offset circumferentially and the transverse sipes of two adjacent ribs are offset with respect to one another such that these transverse sipes come into contact with the road surface at different times.

By virtue of these arrangements of the transverse sipes 5 and of the external cavities 311 of the complex groove 31, it is possible to create a tread that has a satisfactory level of grip, in particular when running on ground covered with water, and does not develop uneven wear while at the same time limiting running noise. Furthermore, this tread reduces the risk of the initiation of cracks associated with picking up a stone.

The An embodiment of the invention was tested on a tire for a heavy-duty vehicle of the size 315/70 R 22.5.

This tread 1 has a width W equal to 265 mm and a thickness of material to be worn away equal to 13 mm; it is provided with a tread pattern formed of five circumferentially oriented complex grooves having a depth equal to 13 mm.

The complex grooves have external cavities that open onto the tread surface when new and internal cavities that are hidden within the tread. These external and internal cavities are connected together to form a complex groove around the entire circumference of the tire. The mean width of these internal and external cavities is equal to 8 mm. The external cavities and the internal cavities have a depth equal to 13 mm.

The external cavities 311 have a contour 310 on the tread surface 10 when new of elongate symmetric octagonal shape with a mean length Lm that is equal, in this variant, to 33 mm. These external cavities 311 are arranged in the circumferential direction at a spacing equal to 66 mm.

The tread pattern of the tread thus delimits four intermediate ribs 21 and two edge ribs 22, the latter axially delimiting the width W of the tread. Each intermediate rib is delimited by two complex grooves.

The grooves are arranged such that the intermediate ribs all have the same mean width Ln equal to 30 mm.

This tread has a volumetric void ratio when new of 12.5%.

Moreover, each intermediate rib comprises sipes 5 of oblique overall orientation that are mutually parallel on one and the same rib and arranged at a mean spacing Pm (corresponding to the mean distance between two adjacent sipes measured in the circumferential direction); in the present case, this spacing Pm is equal to 22 mm for a tire A according to the invention and 55 mm for a test tire B not according to the invention, meeting the targeted grip criteria.

The overall orientation of a sipe 5 is obtained as being the angle made by a segment of straight line passing through the end points of the sipe with the transverse direction—indicated by the axis YY' in the plane of FIG. 4. The sipes 5 are made on all the intermediate ribs with an overall orientation that makes a mean angle—in terms of absolute value—equal to 27 degrees with the transverse direction, or 73° (>45°) with the longitudinal direction. Moreover, these sipes 5 are arranged on the intermediate ribs so as to give the tread pattern of the tread 1 a directional nature, the sipes 5 on one half of the tread having one and the same orientation, while, on the other half, the angle of orientation is of opposite value.

To obtain a good level of performance in terms of grip, in particular on ground covered with water, without developing uneven wear and while at the same time limiting running noise, one sipe 5 per rib opens onto each external cavity 311 of the complex grooves. The closest of the ends A and B of the contour of each external cavity 311 are at respective distances of 5 mm.

By positioning these sipes 5 as close as possible to the ends A and B of the contour 310 of each external cavity 311, and by limiting the difference between these distances, it is, surprisingly, possible to solve the problems mentioned and also limit the risk of initiating cracks as a result of picking up a stone.

The tire according to the invention improves the performance of the tire B by 1 dB, the performance being tested according to the standard in force in the European Union (UNECE Reg. 117) relating to the performance aspects of tires. Furthermore, the grip on low-grip ground, the coefficient of friction of which is less than 0.1, is improved by 30%.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire tread comprising:
   a tread surface,
   this tread being provided with a tread pattern formed by at least two longitudinally oriented grooves, the tread pattern having a maximum tread pattern depth Hm,
   at least one of the longitudinally oriented grooves, known as a complex groove, comprising alternately external cavities that open onto the tread surface in a new state and internal cavities that are hidden within the thickness of the tread in the new state,
   the external cavities of each complex groove opening onto the tread surface when in the new state with a contour having a mean longitudinal length Lm, and furthest apart end points A and B, the external cavities having a depth at least equal to 0.9 Hm,
   the external cavities of each complex groove being separated by internal cavities having a mean longitudinal length Li, Li being at least equal to 0.5*Lm and at most equal to 2*Lm,
   this tread comprising at least one rib oriented in the longitudinal direction of the tread and delimited by at least one of said complex grooves, the rib comprising transverse sipes-that is to say sipes with an orientation equal to or greater than 45 degrees to the longitudinal direction, made at a mean spacing Pm, the depth of these transverse sipes being at least equal to the depth 0.1*Hm,
   wherein the mean spacing Pm of the transverse sipes is at most equal to the mean longitudinal length Lm of the external cavities.

2. The tread according to claim 1, wherein the mean spacing Pm of the transverse sipes is at most equal to 0.7*Lm.

3. The tread according to claim 1, wherein the entire longitudinally oriented groove is a complex groove.

4. The tread according to claim 1, wherein the transverse sipes of two adjacent ribs are offset with respect to one another such that these transverse sipes come into contact with a road surface at different times.

5. The tread according to claim 1, wherein the transverse sipes open into the external cavities at a minimum longitudinal distance from the ends A and B of the tread pattern elements of the external cavities at least equal to 1.5 mm.

6. The tread according to claim 1, wherein the tread pattern elements of the external cavities are symmetric with respect to a longitudinal axis.

7. The tread according to claim 1, wherein the tread comprises at least three complex grooves.

8. The tread according to claim 7, wherein the external cavities of two adjacent complex grooves are offset circumferentially by a circumferential distance at least equal to 0.8*Lm.

9. The tread according to claim 1, wherein a volumetric void ratio when in the new state is at most equal to 13%.

10. The tread according to claim 9, wherein the volumetric void ratio when in the new state is at most equal to 10%.

11. A tire for a heavy-duty vehicle provided with a tread according to claim 1.

* * * * *